(12) United States Patent
Irie et al.

(10) Patent No.: US 9,796,034 B2
(45) Date of Patent: Oct. 24, 2017

(54) WIRE ELECTRICAL DISCHARGE MACHINE, MACHINING PATH GENERATOR OF WIRE ELECTRICAL DISCHARGE MACHINE, AND MACHINING METHOD FOR USE IN WIRE ELECTRICAL DISCHARGE MACHINE FOR PERFORMING PATH COMPENSATION IN CONCAVE ARC CORNER PORTION

(71) Applicant: FANUC Corporation, Yamanashi (JP)

(72) Inventors: Shouta Irie, Yamanashi (JP); Kaoru Hiraga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 221 days.

(21) Appl. No.: 14/583,190

(22) Filed: Dec. 25, 2014

(65) Prior Publication Data

US 2015/0183039 A1    Jul. 2, 2015

(30) Foreign Application Priority Data

Dec. 26, 2013  (JP) ................................ 2013-270023

(51) Int. Cl.
*B23H 7/06* (2006.01)
*B23H 7/20* (2006.01)
*B23H 9/00* (2006.01)

(52) U.S. Cl.
CPC .............. *B23H 7/065* (2013.01); *B23H 7/20* (2013.01); *B23H 9/00* (2013.01); *G05B 2219/45221* (2013.01); *G05B 2219/49164* (2013.01)

(58) Field of Classification Search
CPC . B23H 1/02; B23H 7/065; B23H 7/04; B23H 2600/10; B23H 2600/12; B23H 9/00; G05B 2219/45221
See application file for complete search history.

(56) References Cited

U.S. PATENT DOCUMENTS

| | | | |
|---|---|---|---|
| 4,465,914 A | 8/1984 | Obara | |
| 4,499,359 A | 2/1985 | Obara | |
| 4,598,190 A | 7/1986 | Balleys | |
| 4,837,415 A * | 6/1989 | Magara | ................. B23H 7/065 219/69.12 |

(Continued)

FOREIGN PATENT DOCUMENTS

| | | |
|---|---|---|
| CH | 605017 A5 | 9/1978 |
| CN | 102026766 A | 4/2011 |

(Continued)

OTHER PUBLICATIONS

Machine translation of Japan Patent document No. 11-221,719, Feb. 2017.*

(Continued)

*Primary Examiner* — Geoffrey S Evans
(74) *Attorney, Agent, or Firm* — Hauptman Ham, LLP (57) ABSTRACT

In the case where the shape of a machining path generated by analyzing a machining program includes a concave arc corner portion, the machining path is compensated by inserting a path leading from the end point to the start point of the concave arc along a path inside the concave arc and leading from the start point to the end point of the concave arc on the concave arc again.

15 Claims, 9 Drawing Sheets

(56) References Cited

U.S. PATENT DOCUMENTS

| | | | | |
|---|---|---|---|---|
| 5,047,606 A | * | 9/1991 | Hiramine | B23H 7/065 219/69.12 |
| 5,185,507 A | | 2/1993 | Yasui | |
| 6,184,485 B1 | | 2/2001 | Day et al. | |
| 6,621,032 B1 | * | 9/2003 | Katou | B23H 7/02 219/69.12 |
| 6,774,334 B1 | | 8/2004 | Kobayashi | |
| 2008/0251500 A1 | * | 10/2008 | Hiraga | B23H 7/065 219/69.12 |
| 2011/0100959 A1 | * | 5/2011 | Onodera | B23H 7/065 219/69.13 |
| 2011/0226742 A1 | | 9/2011 | Onodera et al. | |
| 2013/0238114 A1 | * | 9/2013 | Hiraga | G05B 13/021 700/193 |
| 2014/0175063 A1 | * | 6/2014 | Niu | B23H 7/065 219/69.12 |
| 2014/0190940 A1 | * | 7/2014 | Hiraga | B23H 7/06 219/69.12 |
| 2014/0330423 A1 | | 11/2014 | Hara et al. | |

FOREIGN PATENT DOCUMENTS

| | | | | |
|---|---|---|---|---|
| CN | 103231135 A | | | 8/2013 |
| CN | 103909312 A | | | 7/2014 |
| EP | 2133167 A2 | | | 12/2009 |
| GB | 1590640 A | | | 6/1981 |
| JP | 53-64638 A | | | 6/1978 |
| JP | 56-146626 A | | | 11/1981 |
| JP | 57-114331 A | | | 7/1982 |
| JP | 58-217228 A | | | 12/1983 |
| JP | 59-115125 A | | | 7/1984 |
| JP | 60-108219 A | * | | 6/1985 |
| JP | 01-177919 A | * | | 7/1989 |
| JP | 4-217426 A | | | 8/1992 |
| JP | 7-9261 A | | | 1/1995 |
| JP | 07-024645 A | * | | 1/1995 |
| JP | 7-24645 A | | | 1/1995 |
| JP | 10-263933 A | | | 10/1998 |
| JP | 11-207527 A | | | 8/1999 |
| JP | 11-221719 A | * | | 8/1999 |
| JP | 2000-107942 A | * | | 4/2000 |
| JP | 2008-36720 A | | | 2/2008 |
| JP | 2008-260081 A | | | 10/2008 |
| JP | 2010-23138 A | | | 2/2010 |
| JP | 2010-99824 A | | | 5/2010 |
| JP | 2014-121755 A | | | 7/2014 |
| TW | 182516 A | | | 4/1992 |
| TW | 201328804 A1 | | | 7/2013 |
| WO | 02/36295 A1 | | | 5/2002 |
| WO | 2010/050014 A1 | | | 5/2010 |
| WO | 2013/105235 A1 | | | 7/2013 |

OTHER PUBLICATIONS

Extended European Search Report dated Sep. 4, 2015, corresponding to European Patent Application No. 14197101.0.

Decision to Grant a Patent mailed Oct. 13, 2015, corresponding to Japanese Patent Application No. 2013-270023.

Office Action in CN Application No. 201410821722.3, dated Nov. 17, 2016.

Office Action in CN Application No. 201410821722.3, dated Apr. 6, 2017.

* cited by examiner

| OFFSET MEMORY 1 | OFFSET MEMORY 2 | OFFSET MEMORY 3 | OFFSET MEMORY 4 | OFFSET MEMORY 5 |
|---|---|---|---|---|
| OFFSET MEMORY 6 | OFFSET MEMORY 7 | OFFSET MEMORY 8 | OFFSET MEMORY 9 | OFFSET MEMORY 10 |
| OFFSET MEMORY 11 | OFFSET MEMORY 12 | OFFSET MEMORY 13 | OFFSET MEMORY 14 | OFFSET MEMORY 15 |
| OFFSET MEMORY 16 | ................ | | | |

```
O0500
G92X0.0Y0.0
S2D2G04X2.          ←D2:  COMMAND ON OFFSET AMOUNT
G91G01G42Y-5.0      ←G42: RIGHT OFFSET COMMAND
G01X-4.5
G02X-0.5Y0.5J0.5    ←G02: CLOCKWISE ARC COMMAND (PORTION <1>)
G01Y2.0
G02X0.5Y0.5I0.5
G01X2.0
G03X0.5Y0.5J0.5     ←G03: COUNTERCLOCKWISE ARC COMMAND
                          (PORTION <3>)
G01Y2.0
G03X-0.5Y0.5I-0.5
G01X-2.0
G02X-0.5Y0.5J0.5
G01Y2.0
G02X0.5Y0.5I0.5
G01X9.0
G02X0.5Y-0.5J-0.5
G01Y-2.0
G02X-0.5Y-0.5I-0.5
G01X-2.0
G03X-0.5Y-0.5J-0.5
G01Y-3.0
G03X0.5Y-0.5I0.5
G01X2.0
G02X0.5Y-0.5J-0.5
G01Y-2.0
G02X-0.5Y-0.5I-0.5
G01X-4.5
G40Y5.0             ←G40: OFFSET CANCEL COMMAND
M30
```

```
O0501
G92X0.0Y0.0
S2D2G04X2.
G91G01G42Y-5.0
G01X-4.5
G02X-0.5Y0.5J0.5    ←G02: CLOCKWISE ARC COMMAND (PORTION <1>)
G02X0.0Y0.0I0.5     ←INSERTED CIRCLE (PORTION <1>)
G01Y2.0
G02X0.5Y0.5I0.5
G02X0.0Y0.0J-0.5    ←INSERTED CIRCLE (PORTION <2>)
G01X2.0
G03X0.5Y0.5J0.5
G01Y2.0
G03X-0.5Y0.5I-0.5
G01X-2.0
G02X-0.5Y0.5J0.5
G02X0.0Y0.0I0.5     ←INSERTED CIRCLE (PORTION <5>)
G01Y2.0
G02X0.5Y0.5I0.5
G02X0.0Y0.0J-0.5    ←INSERTED CIRCLE (PORTION <6>)
G01X9.0
G02X0.5Y-0.5J-0.5
G02X0.0Y0.0I-0.5    ←INSERTED CIRCLE (PORTION <7>)
G01Y-2.0
G02X-0.5Y-0.5I-0.5
G02X0.0Y0.0J0.5     ←INSERTED CIRCLE (PORTION <8>)
G01X-2.0
G03X-0.5Y-0.5J-0.5
G01Y-3.0
G03X0.5Y-0.5I0.5
G01X2.0
G02X0.5Y-0.5J-0.5
G02X0.0Y0.0I-0.5    ←INSERTED CIRCLE (PORTION <11>)
G01Y-2.0
G02X-0.5Y-0.5I-0.5
G02X0.0Y0.0J0.5     ←INSERTED CIRCLE (PORTION <12>)
G01X-4.5
G40Y5.0
M30
```

```
O0501
G92X0.0Y0.0
S2D2G04X2.
G91G01G42Y-5.0
G01X-4.5
G02X-0.5Y0.5J0.5    ←G02: CLOCKWISE ARC COMMAND (PORTION <1>)
G02X0.5Y-0.5J-0.5   ←INSERTED ARC (PORTION <1>)
G02X-0.5Y0.5J0.5    ←INSERTED ARC (PORTION <1>)
G01Y2.0
G02X0.5Y0.5I0.5
G02X-0.5Y-0.5I-0.5  ←INSERTED ARC (PORTION <2>)
G02X0.5Y0.5I0.5     ←INSERTED ARC (PORTION <2>)
G01X2.0
G03X0.5Y0.5J0.5
G01Y2.0
G03X-0.5Y0.5I-0.5
G01X-2.0
G02X0.5Y-0.5J-0.5   ←INSERTED ARC (PORTION <5>)
G02X-0.5Y0.5J0.5    ←INSERTED ARC (PORTION <5>)
G01Y2.0
G02X0.5Y0.5I0.5
G02X-0.5Y-0.5I-0.5  ←INSERTED ARC (PORTION <6>)
G02X0.5Y0.5I0.5     ←INSERTED ARC (PORTION <6>)
G01X9.0
G02X0.5Y-0.5J-0.5
G02X-0.5Y0.5J0.5    ←INSERTED ARC (PORTION <7>)
G02X0.5Y-0.5J-0.5   ←INSERTED ARC (PORTION <7>)
G01Y-2.0
G02X-0.5Y-0.5I-0.5
G02X0.5Y0.5I0.5     ←INSERTED ARC (PORTION <8>)
G02X-0.5Y-0.5I-0.5  ←INSERTED ARC (PORTION <8>)
G01X-2.0
G03X-0.5Y-0.5J-0.5
G01Y-3.0
G03X0.5Y-0.5I0.5
G01X2.0
G02X0.5Y-0.5J-0.5
G02X-0.5Y0.5J0.5    ←INSERTED ARC (PORTION <11>)
G02X0.5Y-0.5J-0.5   ←INSERTED ARC (PORTION <11>)
G01Y-2.0
G02X-0.5Y-0.5I-0.5
G02X0.5Y0.5I0.5     ←INSERTED ARC (PORTION <12>)
G02X-0.5Y-0.5I-0.5  ←INSERTED ARC (PORTION <12>)
G01X-4.5
G40Y5.0
M30
```

```
O0501
G92X0.0Y0.0
S2D2G04X2.
G91G01G42Y-5.0
G01X-4.5
G02X-0.5Y0.5J0.5    ←G02: CLOCKWISE ARC COMMAND (PORTION <1>)
G01X0.5Y-0.5        ←INSERTED STRAIGHT LINE (PORTION <1>)
G02X-0.5Y0.5J0.5    ←INSERTED ARC (PORTION <1>)
G01Y2.0
G02X0.5Y0.5I0.5
G01X-0.5Y-0.5       ←INSERTED STRAIGHT LINE (PORTION <2>)
G02X0.5Y0.5I0.5     ←INSERTED ARC (PORTION <2>)
G01X2.0
G03X0.5Y0.5J0.5
G01Y2.0
G03X-0.5Y0.5I-0.5
G01X-2.0
G01X0.5Y-0.5        ←INSERTED STRAIGHT LINE (PORTION <5>)
G02X-0.5Y0.5J0.5    ←INSERTED ARC (PORTION <5>)
G01Y2.0
G02X0.5Y0.5I0.5
G01X-0.5Y-0.5       ←INSERTED STRAIGHT LINE (PORTION <6>)
G02X0.5Y0.5I0.5     ←INSERTED ARC (PORTION <6>)
G01X9.0
G02X0.5Y-0.5J-0.5
G01X-0.5Y0.5        ←INSERTED STRAIGHT LINE (PORTION <7>)
G02X0.5Y-0.5J-0.5   ←INSERTED ARC (PORTION <7>)
G01Y-2.0
G02X-0.5Y-0.5I-0.5
G01X0.5Y0.5         ←INSERTED STRAIGHT LINE (PORTION <8>)
G02X-0.5Y-0.5I-0.5  ←INSERTED ARC (PORTION <8>)
G01X-2.0
G03X-0.5Y-0.5J-0.5
G01Y-3.0
G03X0.5Y-0.5I0.5
G01X2.0
G02X0.5Y-0.5J-0.5
G01X-0.5Y0.5        ←INSERTED STRAIGHT LINE (PORTION <11>)
G02X0.5Y-0.5J-0.5   ←INSERTED ARC (PORTION <11>)
G01Y-2.0
G02X-0.5Y-0.5I-0.5
G01X0.5Y0.5         ←INSERTED STRAIGHT LINE (PORTION <12>)
G02X-0.5Y-0.5I-0.5  ←INSERTED ARC (PORTION <12>)
G01X-4.5
G40Y5.0
M30
```

WIRE ELECTRICAL DISCHARGE MACHINE, MACHINING PATH GENERATOR OF WIRE ELECTRICAL DISCHARGE MACHINE, AND MACHINING METHOD FOR USE IN WIRE ELECTRICAL DISCHARGE MACHINE FOR PERFORMING PATH COMPENSATION IN CONCAVE ARC CORNER PORTION

RELATED APPLICATIONS

The present application claims priority to Japanese Application Number 2013-270023, filed Dec. 26, 2013, the disclosure of which is hereby incorporated by reference herein in its entirety.

BACKGROUND OF THE INVENTION

1. Field of the Invention

The present invention relates to a wire electrical discharge machine, a machining path generator of a wire electrical discharge machine, and a machining method for use in a wire electrical discharge machine for performing path compensation in a concave arc corner portion.

2. Description of the Related Art

Figure 13:
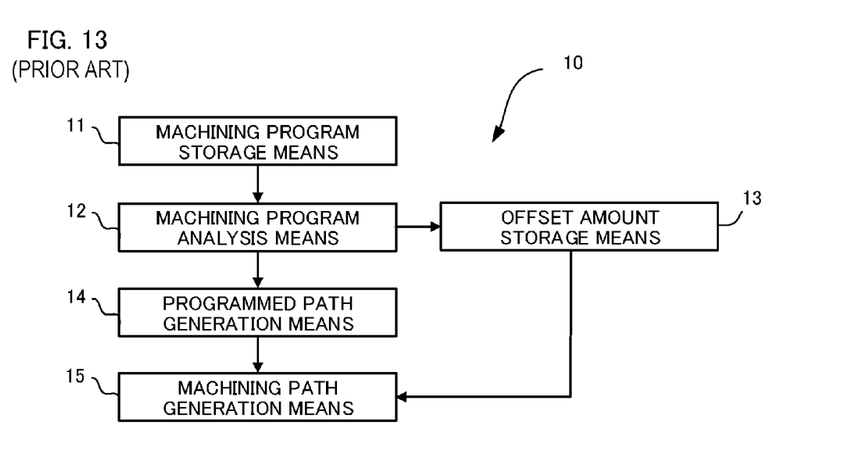
FIG. 13 is a schematic block diagram of a conventional machining path generator.

FIG. 13 is a schematic block diagram of a conventional machining path generator configured to generate a machining path in a wire electrical discharge machine.

Machining program storage means 11 stores a large number of machining programs needed for machining. Machining program analysis means 12 analyzes a machining program specified by an operator or the like, extracts data concerning a programmed path, and transmits the extracted data to programmed path generation means 14. The machining program analysis means 12 also gives an instruction on a needed offset amount to offset amount storage means 13 based on a command code concerning an offset amount in the machining program. The offset amount storage means 13 stores a large number of wire offset amounts needed for machining. The offset amount storage means 13 selects an offset amount needed for machining for each cutting pass as instructed by the machining program analysis means 12, and transmits the offset amount to machining path generation means 15. The programmed path generation means 14 receives data concerning a programmed path from the machining program analysis means 12, and generates a programmed path. The machining path generation means 15 receives the data concerning a programmed path from the programmed path generation means 14 and the offset amount from the offset amount storage means 13, and, based on these pieces of information, generates a machining path along which a wire actually moves.

Each machining program is stored in the machining program storage means 11 by an operator in advance. Moreover, each offset amount is also set by an operator in advance and stored in the offset amount storage means 13. When an operator selects a needed machining program from the machining program storage means 11, the selected machining program is transmitted from the machining program storage means 11 to the machining program analysis means 12. The machining program analysis means 12 analyzes the machining program transmitted from the machining program storage means 11, extracts data concerning a programmed path from the machining program, and transmits the extracted data to the programmed path generation means 14. Moreover, the machining program analysis means 12 gives an instruction on a needed offset amount to the offset amount storage means 13 based on a command code concerning an offset amount.

The programmed path generation means 14 receives the data concerning a programmed path from the machining program analysis means 12, generates a programmed path based on the received data, and transmits the programmed path to the machining path generation means 15. The offset amount storage means 13 selects an offset amount as instructed by the machining program analysis means 12, and transmits the offset amount to the machining path generation means 15. The machining path generation means 15 receives data concerning a programmed path from the programmed path generation means 14 and the instructed offset amount from the offset amount storage means 13, and offsets the programmed path using the offset amount, thus generating a machining path along which a wire electrode 2 actually moves.

In wire electrical discharge machines, improving machining accuracy in a corner portion is an important theme. The shapes of corner portions formed by wire electrical discharge machining include various shapes formed by combinations of arcs, and right, acute and obtuse angles, and projections and depressions. Moreover, with regard to control methods, since characteristics are different between methods concerning rough machining and methods concerning finish machining, various control techniques have heretofore been proposed to improve machining accuracy in corner portions.

In a wire-cutting shape modification method for wire electrical discharge machining disclosed in Japanese Patent Application Laid-Open No. 59-115125, in the case where a machining path intersection of two blocks instructed in a basic program is an intersection to be subjected to concave portion machining, a machining path as a wire electrode travel path having the shape of an arc which has a center at the intersection and which has a radius equal to an offset value for a wire electrode with respect to a machining path is added to the above-described intersection portion.

In the above-described wire-cutting shape modification method, an arc-shaped machining path which has a center at the intersection of the blocks and which has a radius equal to the offset value is added to a workpiece side so that roundness occurring in a concave sharp corner portion, which causes a problem in die machining and the like, may be removed. A corner in which the machining path is compensated is a concave sharp corner, and a newly inserted machining path is located outside the corner. Accordingly, this technique is obviously different from the present invention.

In a wire electrical discharge machining method disclosed in Japanese Patent Application Laid-Open No. 4-217426, in a phase in which a rough cut and subsequent finish cuts are performed, a first cut is performed such that an arc portion in a cutting shape having a radius equal to or less than a preset reference radius is machined using a machining path obtained by inserting an arc which is tangent to machining paths before and after the arc portion and which has a radius smaller than a predetermined radius. In subsequent cuts, machining is performed while the machining path is being converted by gradually increasing the radius of respective arcs to be inserted in machining.

The above-described wire electrical discharge machining method is intended to improve the shape accuracy of a corner portion of an arc-shaped path in a machining program, and intended to reduce the amount of machining in finish cuts as much as possible by setting a machining path for a rough cut at a concave arc corner such that the machining path reaches as deep a position as possible in the corner. This technique exerts effects on the assumption that multiple finish cuts are performed, and the operation thereof is not to insert a path inside the concave arc. Accordingly, this technique is obviously different from the present invention.

In a shape compensation method for wire electrical discharge machining disclosed in Japanese Patent Application Laid-Open No. 57-114331, in the case where an arc-shaped cut is performed, the amount of tangential deflection and the amount of radial deflection are calculated, and a machining path is modified based on deflection amount components.

In the above-described shape compensation method, the amount of deflection during linear machining is measured in advance, and tangential deflection and radial deflection during an arc-shaped cut are calculated based on the measured amount to compensate a machining path. This method requires deflection measurement and has the problem that a dull corner or an overcut occurs if compensation amounts are not accurately calculated. Moreover, since the compensation of a machining path does not eliminate the deflection of a wire, there is also a problem that deviation from straightness accuracy with respect to the thickness direction of the workpiece is not eliminated. Further, the operation thereof is not to insert a path inside the concave arc. Accordingly, this technique is obviously different from the present invention.

In a controller and a machining path generator of a wire electrical discharge machine disclosed in Japanese Patent Application Laid-Open No. 2010-99824, in the case of a cutting shape including a concave sharp corner portion formed by two intersecting linear movement blocks which are not parallel to each other, a portion of the cutting shape on the concave sharp corner portion side is deleted, and a movement block for an arc shape having a set radius is inserted in the deleted portion.

The above-described machining path generator compensates a machining path by inserting an arc-shaped block in a concave sharp corner, thus preventing an increase in the amount of machining when multiple cuts are performed on the concave sharp corner portion, and improving machining accuracy. A corner in which the machining path is compensated is a concave sharp corner, and the operation thereof is to delete a portion of a linear block and newly insert an arc-shaped block. Accordingly, this technique is obviously different from the present invention.

In a controller of a wire electrical discharge machine disclosed in Japanese Patent Application Laid-Open No. 2008-260081, in the case of a cutting shape including a concave sharp corner portion formed by two intersecting linear movement blocks which are not parallel to each other, a portion of the cutting shape on the concave sharp corner portion side is deleted in each cutting pass after a set reference number of cutting passes, and a movement block for an arc shape having a radius of curvature determined based on an offset difference is inserted.

The above-described controller compensates a machining path by inserting a block for an arc shape in a concave sharp corner, thus preventing an increase in the cutting margin of a concave sharp corner portion, and improving machining accuracy. Similar to the aforementioned technique disclosed in Japanese Patent Application Laid-Open No. 2010-99824, a corner in which the machining path is compensated is a concave sharp corner, and the operation thereof is to delete a portion of a linear block and newly insert an arc-shaped block. Accordingly, this technique is obviously different from the present invention.

SUMMARY OF THE INVENTION

Accordingly, an object of the present invention is to provide a wire electrical discharge machine, a machining path generator of a wire electrical discharge machine, and a machining method for use in a wire electrical discharge machine for performing path compensation in a concave arc corner portion which improve machining accuracy by compensating a programmed path or a machining path in the concave arc corner portion.

A first aspect of a wire electrical discharge machine according to the present invention includes a machining program storage section for storing a machining program; a machining program analysis section for analyzing the machining program stored in the machining program storage section; a programmed path generation section for generating a programmed path based on a result of analysis by the machining program analysis section; and a programmed path compensation section for, if a shape generated by the programmed path generation section has a concave arc corner portion, compensating the programmed path by inserting a path leading from an end point to a start point of the concave arc along a path inside the concave arc and leading from the start point to the end point of the concave arc on the concave arc again.

A second aspect of the wire electrical discharge machine according to the present invention includes a machining program storage section for storing a machining program; an offset amount storage section for storing a wire offset amount for each cutting pass; a machining program analysis section for analyzing the machining program stored in the machining program storage section; a programmed path generation section for generating a programmed path based on a result of analysis by the machining program analysis section; a machining path generation section for generating a machining path which is offset from the programmed path generated by the programmed path generation section by an amount corresponding to the wire offset stored in the offset amount storage section; and a machining path compensation section for, if the path generated by the machining path generation section comprises a concave arc corner portion, compensating the machining path by inserting a path leading from an end point to a start point of the concave arc along a path inside the concave arc and leading from the start point to the end point of the concave arc on the concave arc again.

A first aspect of a machining path generator of a wire electrical discharge machine according to the present invention includes a machining program storage section for storing a machining program; a machining program analysis section for analyzing the machining program stored in the machining program storage section; a programmed path generation section for generating a programmed path based on a result of analysis by the machining program analysis section; and a programmed path compensation section for, if a shape generated by the programmed path generation section has a concave arc corner portion, compensating the programmed path by inserting a path leading from an end point to a start point of the concave arc along a path inside the concave arc and leading from the start point to the end point of the concave arc on the concave arc again.

A second aspect of the machining path generator of the wire electrical discharge machine according to the present invention includes a machining program storage section for storing a machining program; an offset amount storage section for storing a wire offset amount for each cutting pass; a machining program analysis section for analyzing the machining program stored in the machining program storage section; a programmed path generation section for generating a programmed path based on a result of analysis by the machining program analysis section; a machining path generation section for generating a machining path which is offset from the programmed path generated by the programmed path generation section by the wire offset stored in the offset amount storage section; and a machining path compensation section for, if the path generated by the machining path generation section has a concave arc corner portion, compensating the machining path by inserting a path leading from an end point to a start point of the concave arc along a path inside the concave arc and leading from the start point to the end point of the concave arc on the concave arc again.

The path inserted by the programmed path compensation section or the machining path compensation section may be a circle having the same center and radius as the concave arc, or may be a line segment or an arc of which ends correspond to the start point and the end point of the concave arc.

In a machining method for use in a wire electrical discharge machine according to the present invention, the wire electrical discharge machine includes a machining program storage section for storing a machining program, a machining program analysis section for analyzing the machining program stored in the machining program storage section, and a programmed path generation section for generating a programmed path based on a result of analysis by the machining program analysis section. The machining method includes the step of generating a programmed path by inserting, in a concave arc corner portion of the machining program, a path leading from an end point to a start point of the concave arc along a path inside the concave arc and leading from the start point to the end point of the concave arc on the concave arc again, thus performing machining.

The path inserted in the concave arc corner portion may be a circle having the same center and radius as the concave arc, or may be a line segment or an arc of which ends correspond to the start point and the end point of the concave arc.

The present invention can provide a wire electrical discharge machine, a machining path generator of a wire electrical discharge machine, and a machining method for use in a wire electrical discharge machine for performing path compensation in a concave arc corner portion which improve machining accuracy by compensating a programmed path or a machining path in the concave arc corner portion.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

<Problem in a Concave Arc Corner Portion and a Method of Solving the Same>

When machining is performed using a wire electrical discharge machine (wire-cut electric discharge machine), if a wire electrode is instructed to travel along a path as instructed by a machining program, then the size of a workpiece machined is made smaller by an amount corresponding to the sum of the radius of the wire electrode and a discharge gap. Accordingly, in general, an offset amount specified with consideration given to the radius of the wire and the discharge gap is given to a programmed path formed by a machining program to generate a machining path along which a wire electrode 2 moves, and the wire is moved relative to the workpiece in accordance with the machining path.

Figure 1:
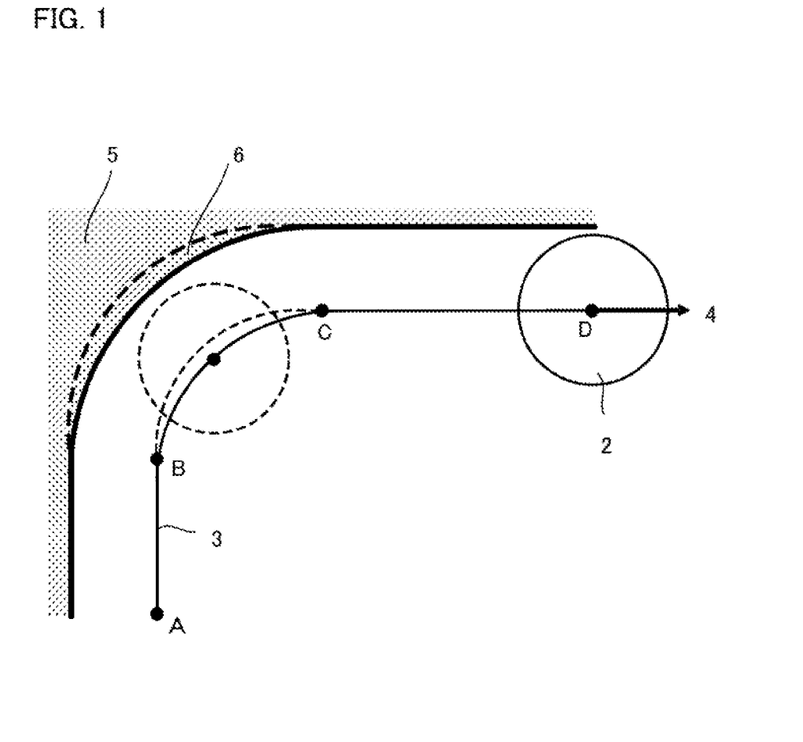
FIG. 1 shows the machining of a concave arc corner portion using a wire electrical discharge machine.

FIG. 1 illustrates the machining of a concave arc corner portion using a wire electrical discharge machine.

The wire electrode 2 travels along a machining path 3 from point A to points B, C, and D in order, and then travels in a machining direction 4. During this travel, the wire electrode 2 is deflected by electrical discharge repulsion occurring between the wire electrode 2 and the workpiece 5. Due to this deflection, remaining portion 6 (called dull corner) is left on the workpiece 5 when a concave arc corner portion is machined. Specifically, while the original machining path 3 between points B and C is a path represented by a broken line, the wire electrode 2 travels along a path represented by a solid line in actual machining. A programmed path is also originally a path represented by a broken line, but actually becomes a path represented by a solid line. This causes the problem that a desired shape accuracy cannot be obtained. This problem becomes more significant in a case where a radius of a concave arc shape is smaller.

Figure 2:
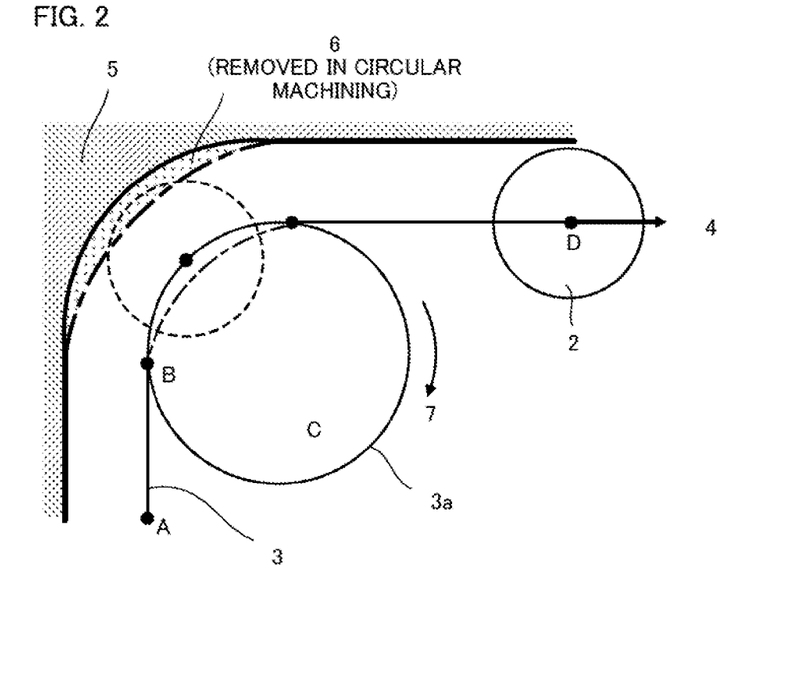
FIG. 2 is a view for explaining a machining method in which a circular machining path is inserted directly after a concave arc shape.

One way to solve this problem is to insert a circular machining path directly after a concave arc shape as shown in FIG. 2. Specifically, the machining path is compensated such that a circular machining path 3a for performing a circular cut which leads from point C to point B and then to point C again along a path inside the arc in a machining direction 7 (in this example, in a clockwise direction) is added after an arc section BC. After returning to point C, the wire electrode 2 travels to point D as in usual machining.

Operations in actual machining are as follows. When traveling along the arc section BC, the wire electrode 2 which has traveled from point A to point B follows the same machining path as in prior art techniques, which is represented by a dashed dotted line in FIG. 2, because of the deflection thereof caused by electrical discharge repulsion, and remaining portion 6 is left on a machined surface. After passing point C, the wire electrode 2 travels along the inserted circular machining path 3a and returns to point B again. However, point B is a portion which has already been machined, and therefore the workpiece 5, which is a target of electric discharges, does not exit there. Accordingly, electrical discharge repulsion does not act on the wire electrode 2 which has returned to point B, and therefore the wire electrode 2 does not deflect. Thus, when traveling along the section BC again, the wire electrode 2 is released from deflection, and travels along the machining path represented by the solid line. As a result, the remaining portion 6 is removed, and a desired shape accuracy can be obtained. It should be noted that an example in which the inserted circular machining path 3a is a single round of circle has been described here, but a remaining portion may be removed by inserting two or more rounds of circle in the case where the amount of the remaining material is large, such as the case where a thick plate is machined.

In the above-described example, since the inserted machining path is mathematically continuous with the original machining path, a path is obtained which is least prone to disturbance during actual machining. However, as the radius of the concave arc increases, the length of a machining path which does not directly contributing to the machining of a product unnecessarily increases. This may cause a machining efficiency problem or the like. In such a case, if the wire electrode 2 is caused to travel from point C to point B by inserting, inside the concave arc, an arc or a straight line which is not continuous with the original machining path, such as a machining path represented by a broken line 3b or 3c in FIG. 3, electrical discharge repulsion does not act on the wire which has returned to point B.

Figure 3:
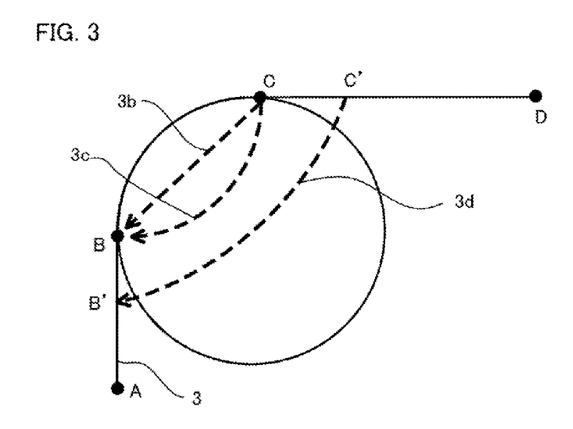
FIG. 3 is a view showing a machining method in which a machining path having a shape other than a circle is inserted directly after a concave arc shape.

It should be noted that in the above-described example, a compensation path is inserted which leads from point C to point B along a path inside the concave arc and then leads from point B to point C on the concave arc again. However, similar effects can be obtained by inserting a compensation path which leads from a position near point C to a position near point B along a path inside the concave arc and then leads from a position near point B to a position near point C on the concave arc again. For example, a compensation path (see a machining path denoted by 3d) may be inserted which leads from point C', located beyond point C along the machining path by a distance corresponding to the deflection of the wire electrode 2, to point B', located before point B along the machining path by the distance corresponding to the deflection of the wire electrode 2, along a path inside the concave arc, then leads from point B', located before point B along the machining path by the distance corresponding to the deflection of the wire electrode 2, to point B again, leads from point B to point C on the concave arc, and leads to point C', located beyond point C along the machining path by the distance corresponding to the deflection of the wire electrode 2.

<Discrimination Between Concave and Convex Corners>

Figure 4A:
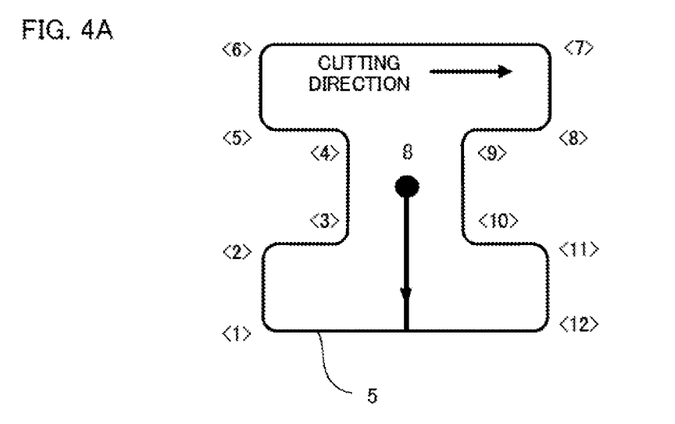
FIGS. 4A and 4B are views showing the case where the finish machining of a die shape is performed.
Figure 4B:
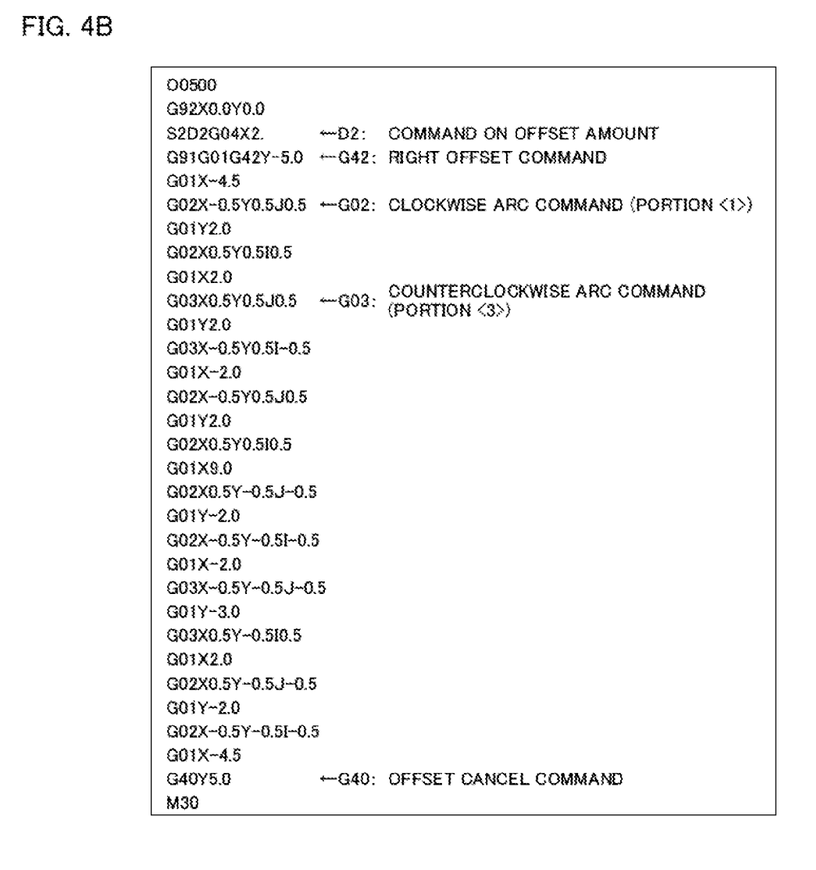
Figure 5:
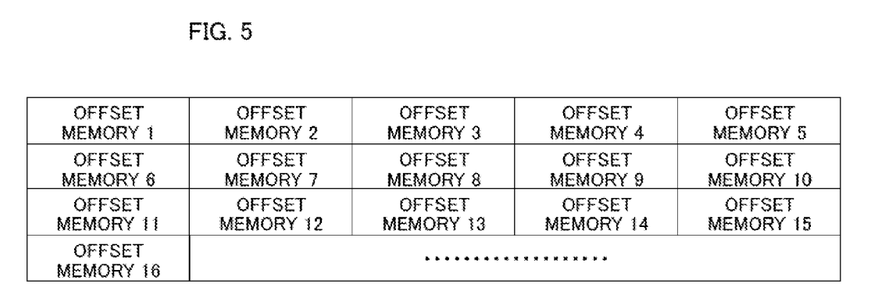
FIG. 5 is a view showing an example of offset amount storage means.

For example, in the case where machining is performed for finishing a die shape such as shown in FIG. 4A, a machining program for that is a program such as shown in FIG. 4B. In the machining program, before the wire electrode 2 starts moving, an offset amount to be used is instructed. In this example, an offset amount stored in "offset memory 2" of offset amount storage means is invoked by the command code "D2" and used (see FIG. 5).

Machining starts at a machining start point 8 on the workpiece 5, and an offset becomes effective from a block for actually machining the workpiece 5 into the shape of a product (the command "G42"). A path along which the wire electrode 2 actually moves is offset from a programmed path instructed by the machining program toward the right in this example, but can be offset toward the left using the command code "G41." In machining blocks subsequent to this block, until the offset is canceled using the command code "G40," the machining is continued with the wire electrode 2 offset toward the right, and the value of the offset amount instructed with "D2" is maintained during the machining.

It is assumed here that the machining of the workpiece 5 into the shape of a product is started and the wire electrode 2 passes corner <1>.

The offset is given in the right direction with respect to the path instructed by the machining program. At this corner, the path turns in the same direction as the offset, i.e., turns to the right. On the other hand, at corner <3>, the path turns in the direction opposite to that of the offset, i.e., turns to the left. When the machining proceeds to the end and the machining of the product is finished, corner <1> has a concave shape, and corners <2>, <5>, <6>, <7>, <8>, <11>, and <12> also have concave shapes. On the other hand, corner <3> has a convex shape, and corners <4>, <9>, and <10> also have convex shapes. In other words, corners turning in the direction opposite to the direction of the offset for the wire electrode are convex corners, and corners turning in the same direction as the direction of the offset for the wire electrode are concave corners. In this way, control means of the wire electrical discharge machine discriminates between concave and convex corners.

<Compensation by the Insertion of a Circular Shape>

Figure 6A:
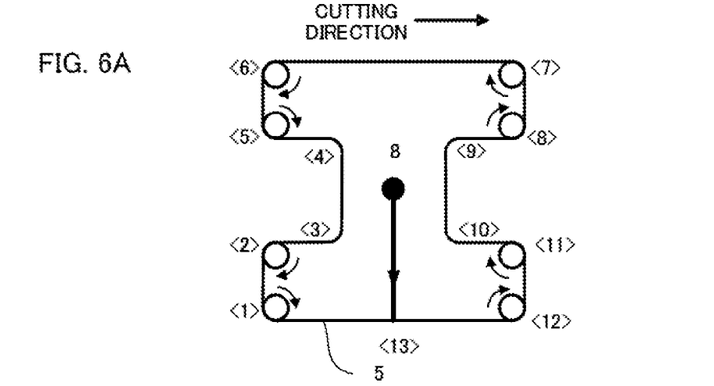
FIG. 6A is a view showing an example of a machining path obtained by inserting circular shapes.

Based on the above-described discrimination between concave and convex corners, a circular shape such as shown in FIG. 2 is inserted in concave arc corner portions of a machining path such as shown in FIG. 4A. Then, a machining path such as shown in FIG. 6A is obtained.

At portion <1>, the machining path is compensated by inserting a single clockwise round of circle directly after the concave arc such that the end of the single round of circle is connected to a straight line extending to portion <2>. At portion <2>, the machining path is compensated by inserting a single clockwise round of circle directly after the concave arc such that the end of the single round of circle is connected to a straight line extending to portion <3>. At portion <5>, the machining path is compensated by inserting a single clockwise round of circle directly after the concave arc such that the end of the single round of circle is connected to a straight line extending to portion <6>. At portion <6>, the machining path is compensated by inserting a single clockwise round of circle directly after the concave arc such that the end of the single round of circle is connected to a straight line extending to portion <7>. At portion <7>, the machining path is compensated by inserting a single clockwise round of circle directly after the concave arc such that the end of the single round of circle is connected to a straight line extending to portion <8>. At portion <8>, the machining path is compensated by inserting a single clockwise round of circle directly after the concave arc such that the end of the single round of circle is connected to a straight line extending to portion <9>. At portion <11>, the machining path is compensated by inserting a single clockwise round of circle directly after the concave arc such that the end of the single round of circle is connected to a straight line extending to portion <12>. At portion <12>, the machining path is compensated by inserting a single clockwise round of circle directly after the concave arc such that the end of the single round of circle is connected to a straight line extending to portion <13>. It should be noted that a single round of circle is not inserted in each of portions <3>, <4>, <9>, and <10> forming convex arcs.

Figure 6B:
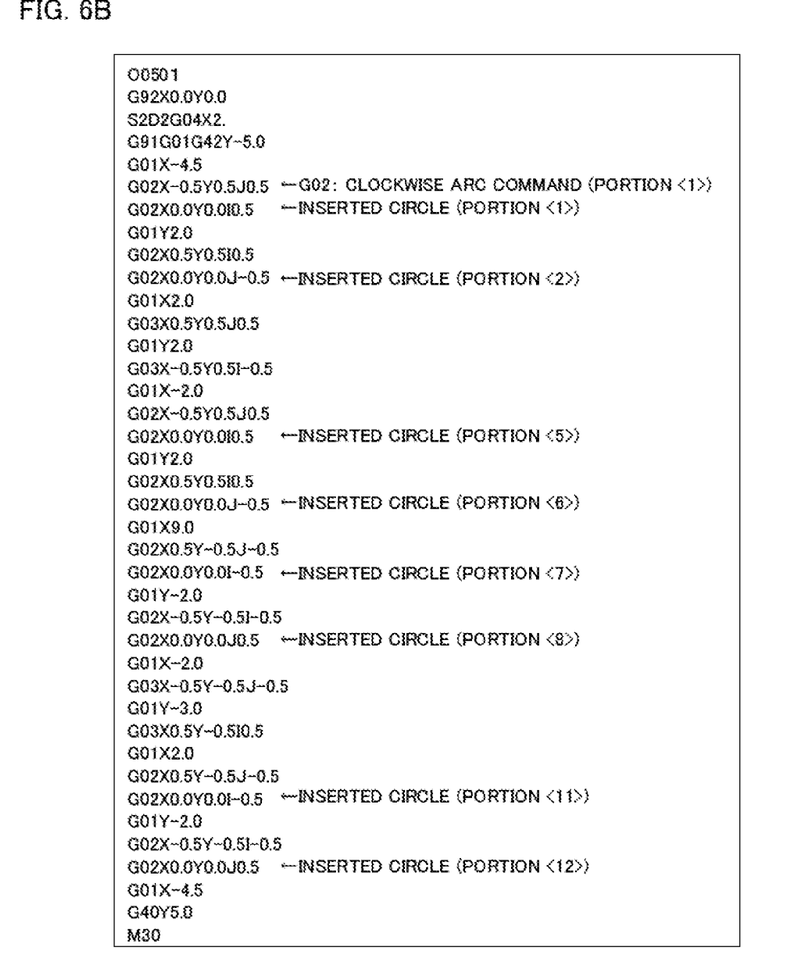
FIG. 6B is a view showing a machining program corresponding to the machining path of FIG. 6A.

The above-described machining path compensation is automatically performed by analyzing the machining program (O0500) in a controller. However, if a machining program including circular movement blocks, such as "O0501" of FIG. 6B, is actually created to compensate the programmed path, similar effects can also be obtained.

While a method in which a circular shape is inserted after a concave arc has been described above as an example, a compensation result having a similar shape can also be obtained by inserting a circular shape before the concave arc, and such compensation may also be employed. Moreover, though a method in which compensation is performed by inserting a single round of circle has been described above as an example, compensation may be performed by inserting two or more round of circle.

<Compensation by the Insertion of Other Shapes>

Figure 7A:
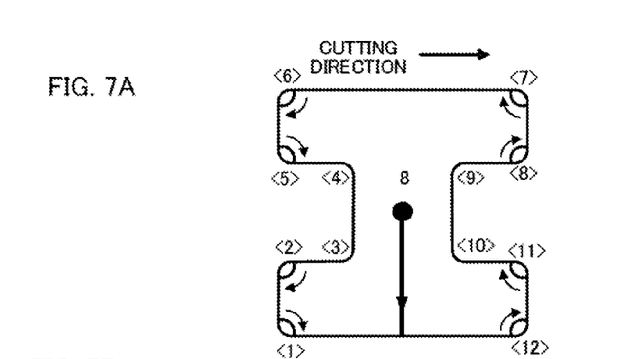
FIG. 7A is a view showing an example of a machining path obtained by inserting arc shapes.
Figure 7B:
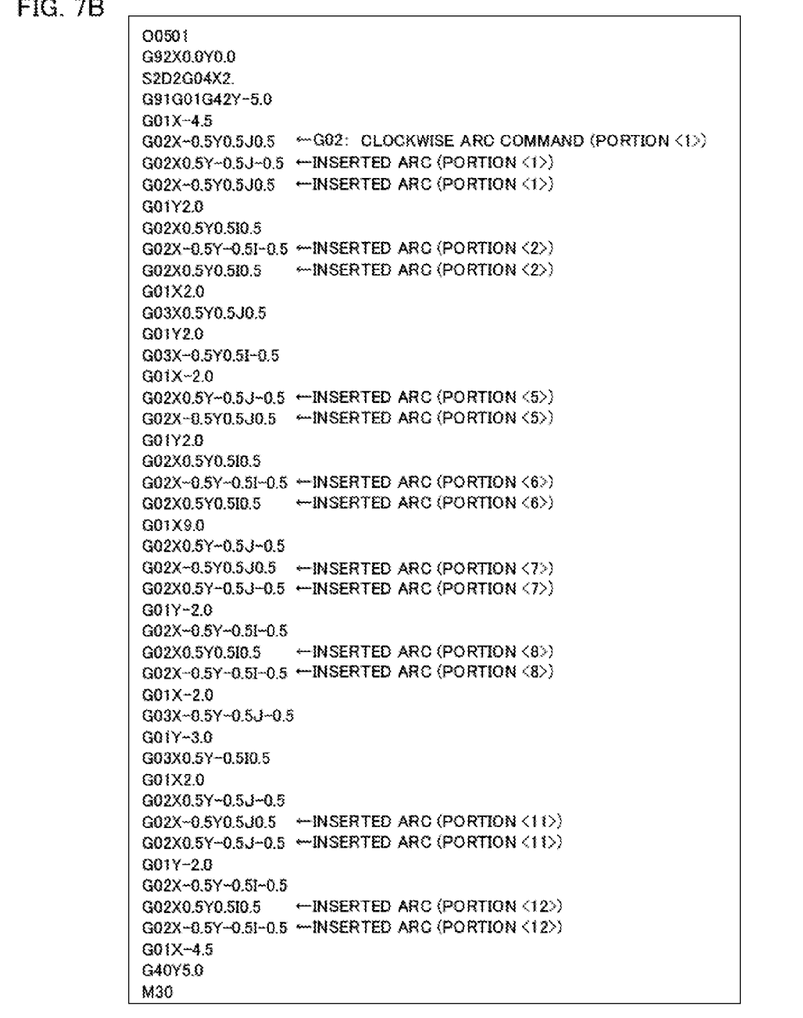
FIG. 7B is a view showing a machining program corresponding to the machining path of FIG. 7A.
Figure 8A:
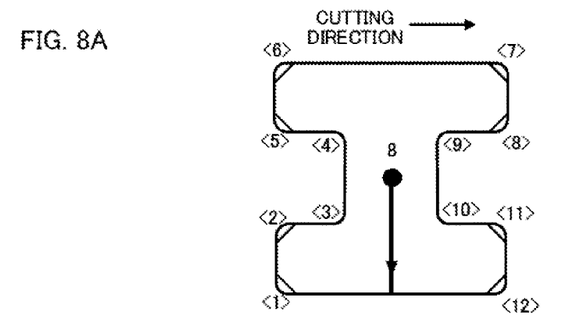
FIG. 8A is a view showing an example of a machining path obtained by inserting linear shapes.
Figure 8B:
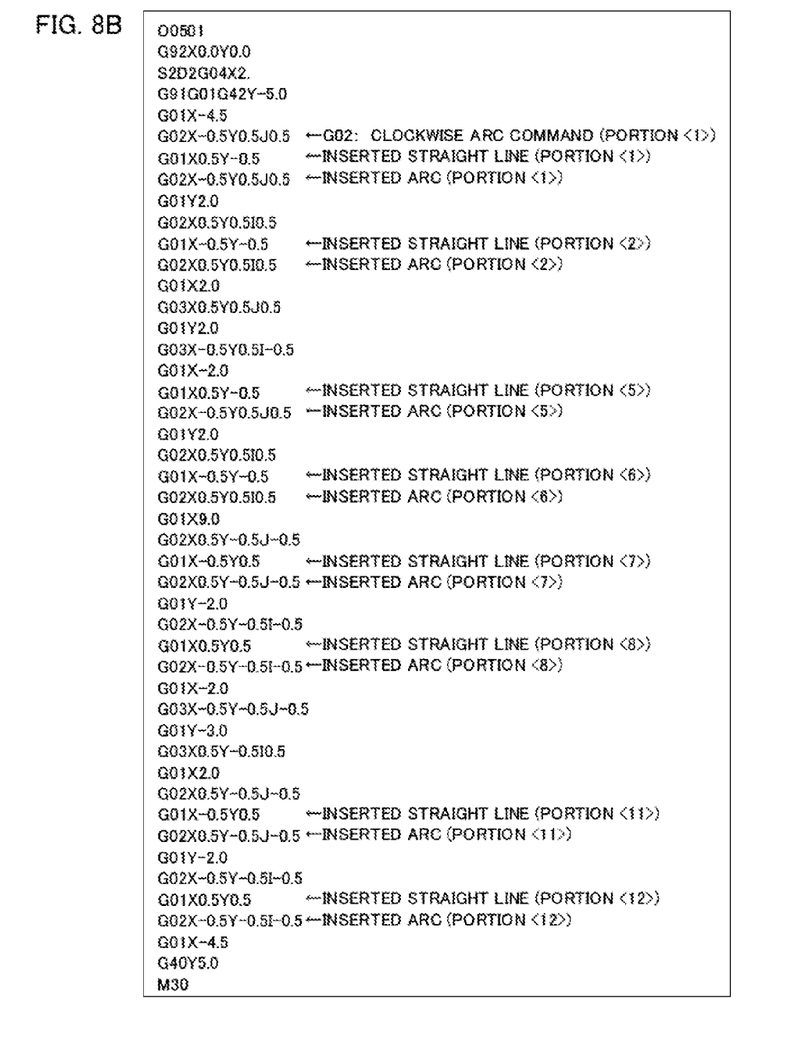
FIG. 8B is a view showing a machining program corresponding to the machining path of FIG. 8A.

A shape to be inserted is not necessarily a circular shape. Effects such as described above can also be obtained by inserting a shape leading from the end point to the start point of the concave arc along an arc or a straight line located inside the concave arc and leading from the start point to the end point of the concave arc on the concave arc again as shown in FIG. 3. FIGS. 7A and 7B show examples of a machining shape and a machining program for the case where an arc is used, and FIGS. 8A and 8B show examples a machining path and a machining program for the case where a straight line is used. In these examples, again, compensation is performed after a concave arc. However, compensation may be performed before a concave arc. Moreover, though methods in which compensation is performed such that a single round is made around a concave arc are illustrated, compensation may be performed such that two or more rounds are made around the concave arc. Further, a generator for such a machining path may exist in a numerical controller mounted on the wire electrical discharge machine or may exist in an external device such as a personal computer.

Embodiments

The outline of compensation in a concave arc corner portion is as described above. There are two methods for performing compensation:

Compensation Method 1: A programmed path is compensated.

Compensation Method 2: An offset is given to a programmed path to generate a machining path, and the machining path is compensated.

These two compensation methods will be described.
(Compensation Method 1)

Figure 9:
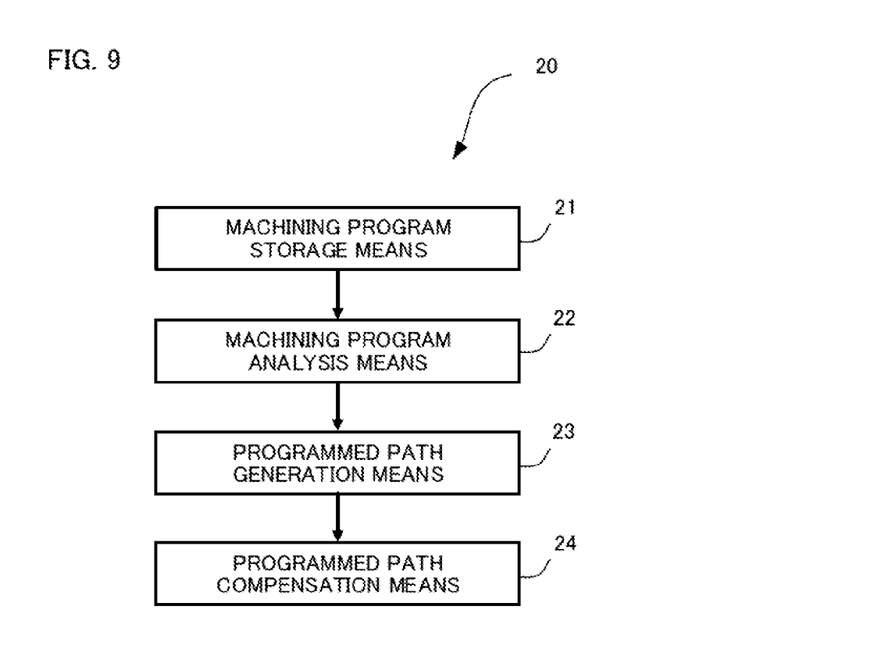
FIG. 9 is a schematic block diagram for explaining a first embodiment of a machining path generator according to the present invention.

FIG. 9 is a view for explaining a first embodiment of a machining path generator configured to execute compensation method 1.

Machining program storage means 21 stores a large number of machining programs needed for machining. Machining program analysis means 22 analyzes a machining program specified by an operator or the like, extracts data concerning a programmed path, and transmits the extracted data to programmed path generation means 23. The programmed path generation means 23 receives data concerning a programmed path from the machining program analysis means 22, and generates a programmed path. Programmed path compensation means 24 analyzes the programmed path generated by the programmed path generation means 23, and compensates the programmed path by inserting in each concave arc corner portion a shape leading from the end point to the start point of a concave arc along a path inside the concave arc and leading from the start point to the end point of the concave arc on the concave arc again.

Each machining program is stored in the machining program storage means 21 by an operator in advance. When an operator selects a needed machining program from the machining program storage means 21, the machining program is transmitted from the machining program storage means 21 to the machining program analysis means 22. The machining program analysis means 22 analyzes the machining program transmitted from the machining program storage means 21, extracts data concerning a programmed path from the machining program, and transmits the extracted data to the programmed path generation means 23.

The programmed path generation means 23 receives the data concerning a programmed path from the machining program analysis means 22, and generates a programmed path. The programmed path compensation means 24 compensates the programmed path by inserting, in each concave arc corner portion of the programmed path generated by the programmed path generation means 23, a shape leading from the end point to the start point of a concave arc along a path inside the concave arc and leading from the start point to the end point of the concave arc on the concave arc again.
(Compensation Method 2)

Figure 10:
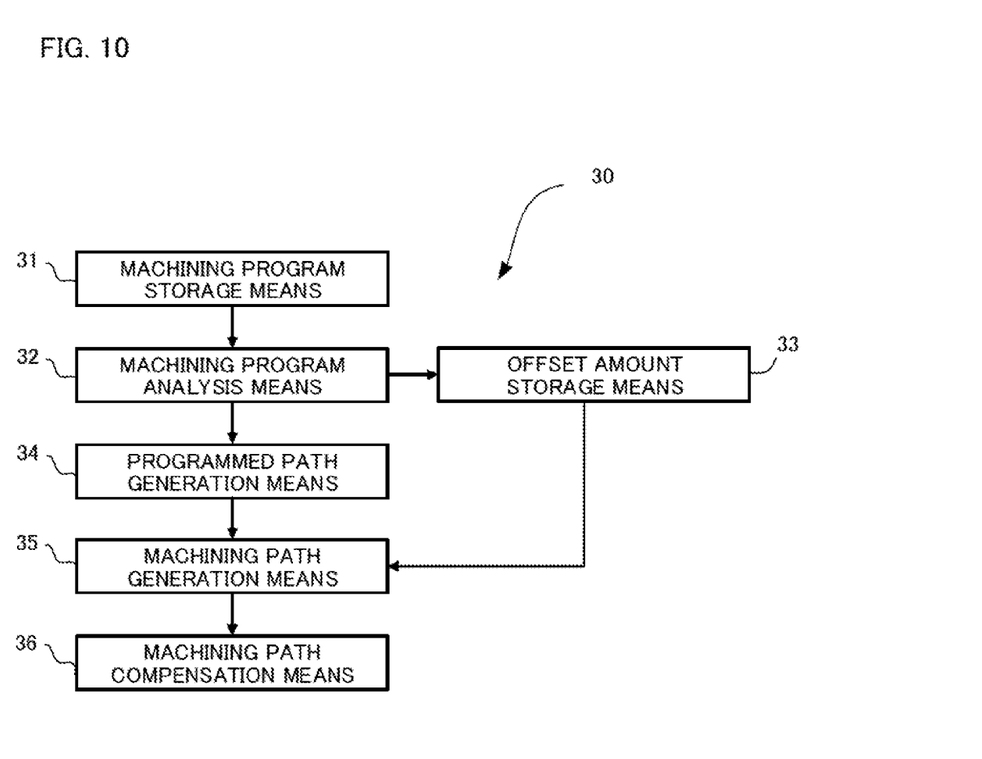
FIG. 10 is a schematic block diagram for explaining a second embodiment of a machining path generator according to the present invention.

FIG. 10 is a view for explaining a second embodiment of a machining path generator configured to execute compensation method 2.

Machining program storage means 31 stores a large number of machining programs needed for machining. Machining program analysis means 32 analyzes a machining program specified by an operator or the like, extracts data concerning a programmed path, and transmits the extracted data to programmed path generation means 34. The machining program analysis means 32 also delivers a needed offset amount to offset amount storage means 33 based on a command code concerning an offset amount in the machining program. The offset amount storage means 33 stores a large number of wire offset amounts needed for machining. The offset amount storage means 33 selects an offset amount needed for machining for each cutting pass as instructed by the machining program analysis means 32, and transmits the offset amount to machining path generation means 35.

The programmed path generation means 34 receives the data concerning a programmed path from the machining program analysis means 32, and generates a programmed path. The machining path generation means 35 receives the data concerning a programmed path from the programmed path generation means 34 and the offset amount from the offset amount storage means 33, and, based on these pieces of information, generates a machining path along which the wire electrode 2 actually moves. Machining path compensation means 36 analyzes the machining path generated by the machining path generation means 35, and compensates the machining path by inserting, in each concave arc corner portion, a shape leading from the end point to the start point of a concave arc along a path inside the concave arc and leading from the start point to the end point of the concave arc on the concave arc again.

Each machining program is stored in the machining program storage means 31 by an operator in advance. Each offset amount is also set by an operator in advance and stored in the offset amount storage means 33. When an operator selects a needed machining program from the machining program storage means 31, the machining program is transmitted from the machining program storage means 31 to the machining program analysis means 32. The machining program analysis means 32 analyzes the machining program transmitted from the machining program storage means 31, extracts data concerning a programmed path from the machining program, and transmits the extracted data to the programmed path generation means 34. The machining program analysis means 32 also delivers a needed offset amount to the offset amount storage means 33 based on a command code concerning an offset amount.

The programmed path generation means 34 receives the data concerning a programmed path from the machining program analysis means 32, and generates a programmed path. The offset amount storage means 33 selects an offset amount as instructed by the machining program analysis means 32, and transmits the offset amount to the machining path generation means 35. The machining path generation means 35 receives the data concerning a programmed path from the programmed path generation means 34 and the specified offset amount from the offset amount storage means 33, and gives the offset amount to the programmed path to generate a machining path along which the wire actually moves. The machining path compensation means 36 compensates the machining path by inserting, in each concave arc corner portion of the machining path generated by the machining path generation means 35, a shape leading from the end point to the start point of a concave arc along a path inside the concave arc and leading from the start point to the end point of the concave arc on the concave arc again.

It should be noted that in the first and second embodiments of the machining path generator, a shape which is inserted in each concave arc corner portion by the programmed path compensation means 24 (FIG. 9) or the machining path compensation means 36 (FIG. 10) and the number of rounds of the shape may be set in the machine in advance, or may be set through an operation screen by an operator. Moreover, a shape to be inserted and the number of rounds may be set by providing a command code for specifying the shape and the number. Moreover, these embodiments are effective in both rough machining and finish machining.

Figure 11:
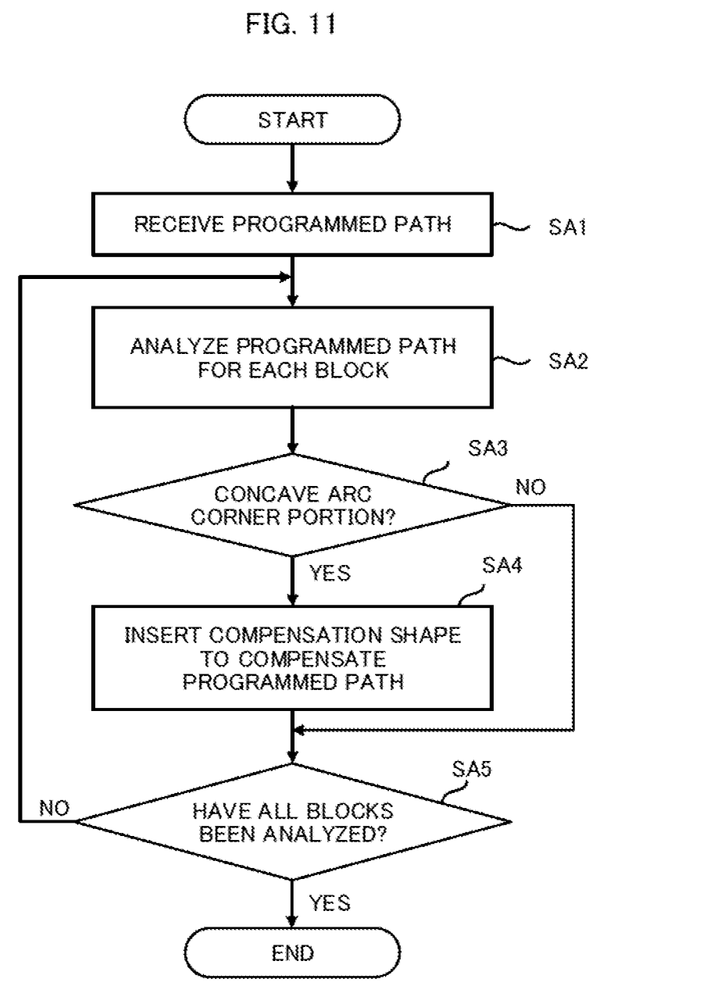
FIG. 11 is a flowchart for explaining the flow of process executed by programmed path compensation means of the machining path generator of FIG. 9.

FIG. 11 is a flowchart for explaining the flow of process executed by the programmed path compensation means in the machining path generator shown in FIG. 9. The process will be described in accordance with steps.

Step SA1: A programmed path is received from the programmed path generation means 23.

Step SA2: The received programmed path is analyzed for each block.

Step SA3: A determination is made as to whether or not the result of the analysis indicates a concave arc corner portion. If the result indicates a concave arc corner portion, the flow proceeds to step SA4. Otherwise, the flow proceeds to step SA5.

Step SA4: The programmed path is compensated by inserting a shape leading from the end point to the start point of a concave arc along a path inside the concave arc and leading from the start point to the end point of the concave arc on the concave arc again.

Step SA5: A determination is made as to whether or not all blocks have been analyzed. If there remain blocks to be analyzed, the flow returns to step SA2 and this process is continued. On the other hand, if all blocks have been analyzed, this process is terminated.

Figure 12:
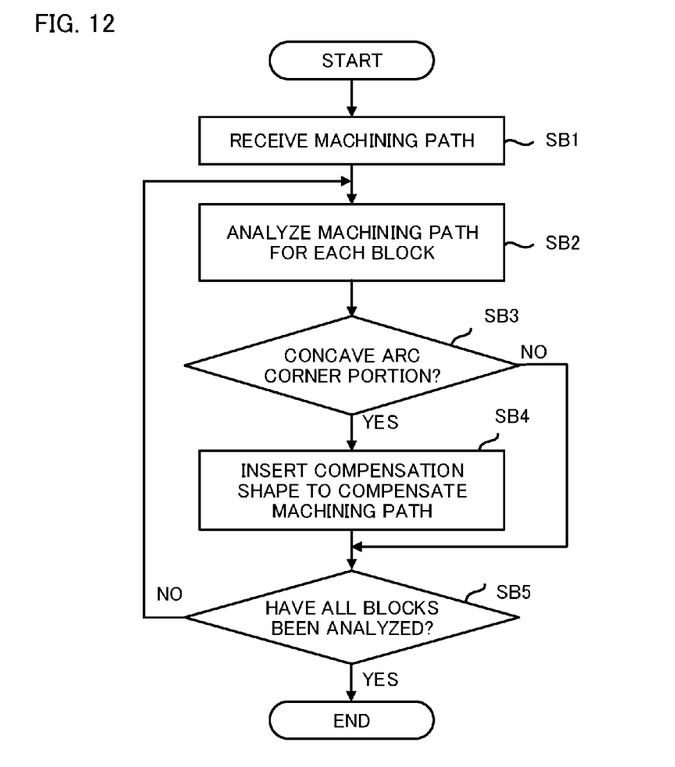
FIG. 12 is a flowchart for explaining the flow of process executed by machining path compensation means of the machining path generator of FIG. 10.

FIG. 12 is a flowchart for explaining the flow of process executed by the machining path compensation means in the machining path generator shown in FIG. 10. The process will be described in accordance with steps.

Step SB1: A machining path is received from the machining path generation means 35.

Step SB2: The received machining path is analyzed for each block.

Step SB3: A determination is made as to whether or not the result of the analysis indicates a concave arc corner portion. If the result indicates a concave arc corner portion, the flow proceeds to step SB4. Otherwise the flow proceeds to step SB5.

Step SB4: The machining path is compensated by inserting a shape leading from the end point to the start point of a concave arc along a path inside the concave arc and leading from the start point to the end point of the concave arc on the concave arc again.

Step SB5: A determination is made as to whether or not all blocks have been analyzed. If there remain blocks to be analyzed, the flow returns to step SB2 and this process is continued. On the other hand, if all blocks have been analyzed, this process is terminated.

The present invention has the following effects.

In actual wire electrical discharge machining, the amount of deflection of a wire electrode varies depending on machining circumstances such as the radius of an arc and the angle between straight portions before and after the concave arc corner. Path compensation, such as disclosed in Japanese Patent Application Laid-Open No. 57-114331, which is performed for removing remaining material in a concave arc corner portion such as shown in FIG. 1 in a manner such that a machining path is deviated from an original machining path (bites a workpiece), causes the problem that it is difficult to determine an amount of compensation appropriate for various machining circumstances.

In the present invention, a machining path is not deviated from an original machining path in a place where remaining material is left. Accordingly, the above-described problem does not occur, and favorable machining accuracy can be obtained in various machining circumstances. Moreover, path compensation performed such that a machining path is deviated from an original machining path does not eliminate the deflection of a wire electrode, and has the following problem: in the case where the thickness of a workpiece is large, remaining material is left in an intermediate portion with respect to the thickness direction of the workpiece even if favorable machining accuracy is obtained at upper and lower ends of the workpiece. On the other hand, in the present invention, after a cut is performed once, machining is performed along the same path in a state in which the deflection of a wire is eliminated. Accordingly, the present invention has an advantageous effect that favorable uniform accuracy can be obtained from the top to the bottom of the workpiece.

The invention claimed is:

1. A wire electrical discharge machine, comprising:
   a wire electrode configured to machine a workpiece by electric discharges;
   a machining program storage storing a machining program; and
   a processor configured to
      perform an analysis of the machining program stored in the machining program storage,
      generate a programmed path for moving the wire electrode relative to the workpiece, based on a result of said analysis, and in response to a shape of the generated programmed path including a concave arc at a corner portion, compensate the generated programmed path by inserting a path leading from an end point to a start point of the concave arc along a path inside the concave arc and leading from the start point to the end point of the concave arc on the concave arc again.

2. The wire electrical discharge machine according to claim 1, wherein the inserted path is a circle having the same center and radius as the concave arc.

3. The wire electrical discharge machine according to claim 1, wherein the inserted path is a line segment or an arc of which ends correspond to the start point and the end point of the concave arc.

4. A wire electrical discharge machine, comprising:
a wire electrode configured to machine a workpiece by electric discharges;
a machining program storage storing a machining program;
an offset amount storage storing a wire offset amount for each cutting pass; and
a processor configured to
perform an analysis of the machining program stored in the machining program storage,
generate a programmed path for moving the wire electrode relative to the workpiece, based on a result of said analysis,
generate a machining path which is offset from the generated programmed path by an amount corresponding to the wire offset amount stored in the offset amount storage, and
in response to the generated machining path including a concave arc at a corner portion, compensate the generated machining path by inserting a path leading from an end point to a start point of the concave arc along a path inside the concave arc and leading from the start point to the end point of the concave arc on the concave arc again.

5. The wire electrical discharge machine according to claim 4, wherein, the inserted path is a circle having the same center and radius as the concave arc.

6. The wire electrical discharge machine according to claim 4, wherein the inserted path is a line segment or an arc of which ends correspond to the start point and the end point of the concave arc.

7. A machining path generator of a wire electrical discharge machine, the wire electrical discharge machine having a wire electrode configured to machine a workpiece by electric discharges, the machining path generator comprising:
a machining program storage storing a machining program; and
a processor configured to
perform an analysis of the machining program stored in the machining program storage,
generate a programmed path for moving the wire electrode relative to the workpiece, based on a result of said analysis, and
in response to a shape of the generated programmed path including a concave arc at a corner portion, compensate the generated programmed path by inserting a path leading from an end point to a start point of the concave arc along a path inside the concave arc and leading from the start point to the end point of the concave arc on the concave arc again.

8. The machining path generator according to claim 7, wherein the inserted path is a circle having the same center and radius as the concave arc.

9. The machining path generator according to claim 7, wherein the inserted path is a line segment or an arc of which ends correspond to the start point and the end point of the concave arc.

10. A machining path generator of a wire electrical discharge machine, the wire electrical discharge machine having a wire electrode configured to machine a workpiece by electric discharges, the machining path generator comprising:
a machining program storage storing a machining program;
an offset amount storage storing a wire offset amount for each cutting pass;
a processor configured to
perform an analysis of the machining program stored in the machining program storage,
generate a programmed path for moving the wire electrode relative to the workpiece, based on a result of said analysis,
generate a machining path which is offset from the generated programmed path by an amount corresponding to the wire offset amount stored in the offset amount storage, and
in response to the generated machining path including a concave arc at a corner portion, compensate the generated machining path by inserting a path leading from an end point to a start point of the concave arc along a path inside the concave arc and leading from the start point to the end point of the concave arc on the concave arc again.

11. The machining path generator according to claim 10, wherein the inserted path a circle having the same center and radius as the concave arc.

12. The machining path generator according to claim 10, wherein the inserted path is a line segment or an arc of which ends correspond to the start point and the end point of the concave arc.

13. A machining method for a wire electrical discharge machine, the wire electrical discharge machine comprising a wire electrode configured to machine a workpiece by electric discharges, a machining program storage storing a machining program and a processor, the machining method comprising:
performing, by the processor, an analysis of the machining program stored in the machining program storage;
generating, by the processor, a programmed path for moving the wire electrode relative to the workpiece, based on a result of said analysis; and
compensating, by the processor, the generated programmed path by inserting, in a concave arc at a corner portion of the generated programmed path, a path leading from an end point to a start point of the concave arc along a path inside the concave arc and leading from the start point to the end point of the concave arc on the concave arc again, thus performing machining.

14. The machining method according to claim 13, wherein the inserted path is a circle having the same center and radius as the concave arc.

15. The machining method according to claim 13, wherein the inserted path is a line segment or an arc of which ends correspond to the start point and the end point of the concave arc.

* * * * *